(12) United States Patent  
Anthamatten et al.

(10) Patent No.: US 6,315,462 B1
(45) Date of Patent: Nov. 13, 2001

(54) FIBER OPTIC CIRCUIT SWITCH AND A PROCESS FOR ITS PRODUCTION

(75) Inventors: Olivier Anthamatten, Villars-sur-Glâne; Cornel Marxer, Neuchâtel, both of (CH)

(73) Assignee: Ascom AG, Bern (CH)

( * ) Notice: Subject to any disclaimer, the term of this patent is extended or adjusted under 35 U.S.C. 154(b) by 0 days.

(21) Appl. No.: 09/269,026
(22) PCT Filed: Sep. 19, 1997
(86) PCT No.: PCT/CH97/00356
§ 371 Date: May 17, 1999
§ 102(e) Date: May 17, 1999
(87) PCT Pub. No.: WO98/12589
PCT Pub. Date: Mar. 26, 1998

(30) Foreign Application Priority Data

Sep. 20, 1996 (CH) .................................................. 2308/96

(51) Int. Cl.[7] ....................................................... G02B 6/36
(52) U.S. Cl. .............................. 385/83; 385/65; 385/147; 216/24; 216/39; 216/42
(58) Field of Search ................................. 216/41, 48, 24, 216/39, 42, 95, 96; 385/65, 83, 147

(56) References Cited

U.S. PATENT DOCUMENTS

| 4,725,127 | | 2/1988 | Malinge et al. . |
| 4,735,677 | * | 4/1988 | Kawachi et al. . |
| 5,404,417 | * | 4/1995 | Johnson et al. ........................ 385/137 |
| 5,548,673 | * | 8/1996 | Kitamura et al. ........................ 385/49 |
| 5,641,612 | * | 6/1997 | Lee et al. ............................. 430/321 |

OTHER PUBLICATIONS

Patent Abstract of Japan of JP Application No. 55–130505, Oct. 9, 1980.

IBM Technical Disclosure Bulletin vol. 32, no. 10b, Mar. 1990, pp. 172–174.

Mohr J. et al.: Microoptical Devices Based on Free Space Optics with LIGA Microoptical Benches Examples & Perspectives Proceedings of the SPIE, vol. 2783, Jun. 12, 1996, pp. 48–54.

* cited by examiner

Primary Examiner—Hung N. Ngo

(57) ABSTRACT

A fiber Optic circuit switch comprises elements constructed entirely from a coating layer on a substrate. A procedure for production of the fiber optic circuit switch is disclosed.

11 Claims, 2 Drawing Sheets

Figure 6:
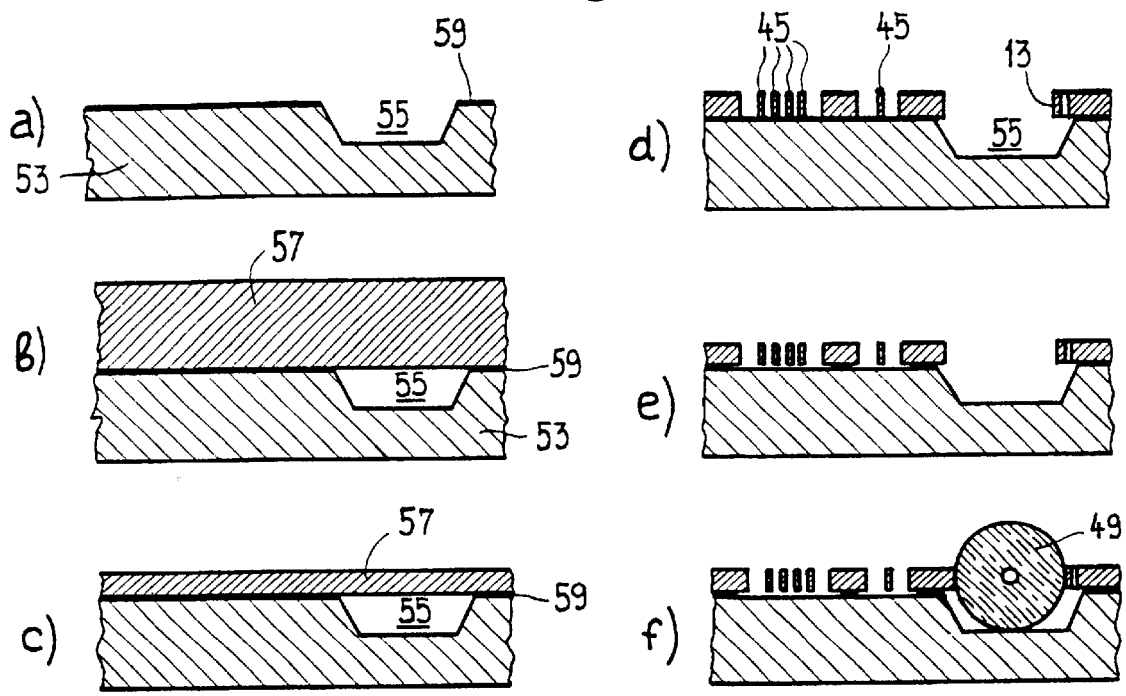

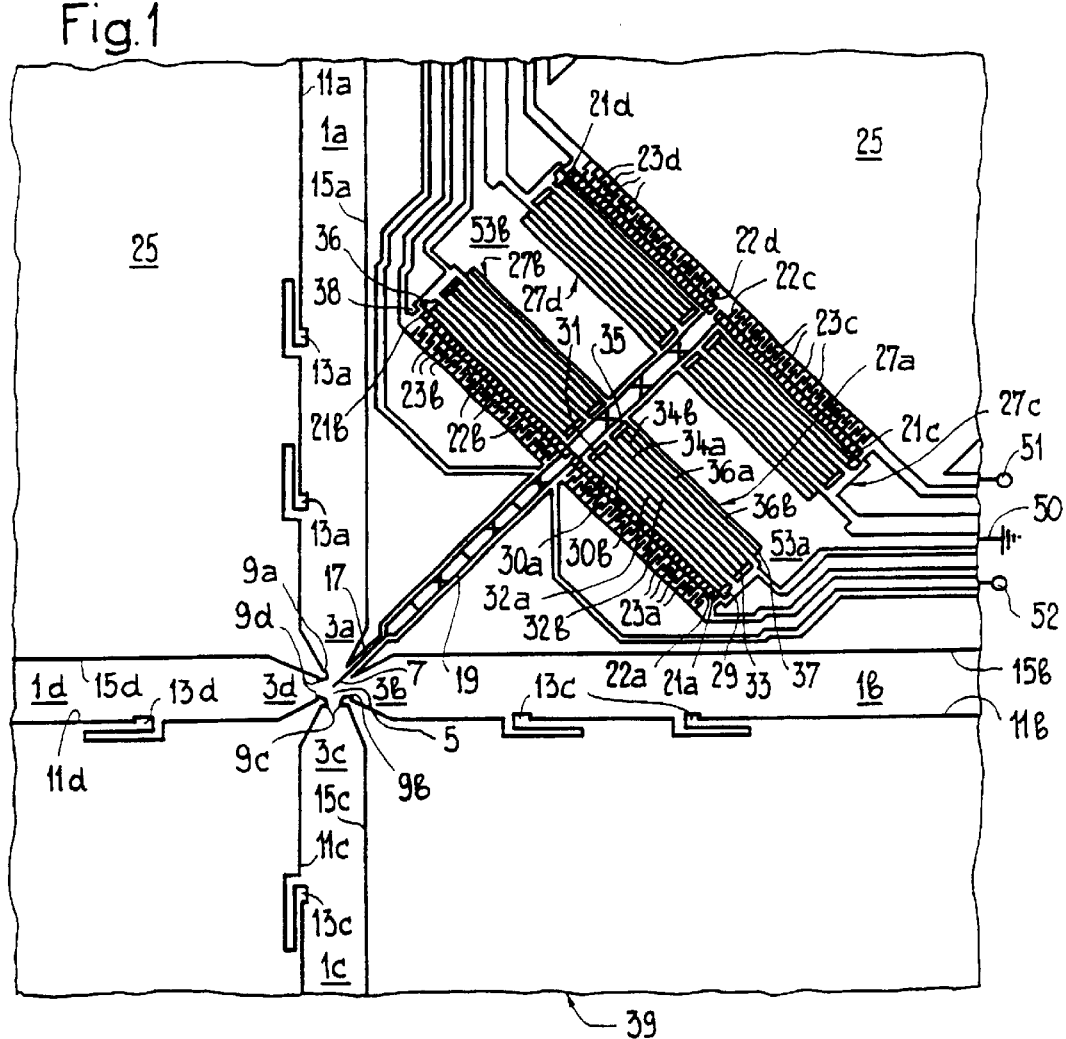
Fig. 1
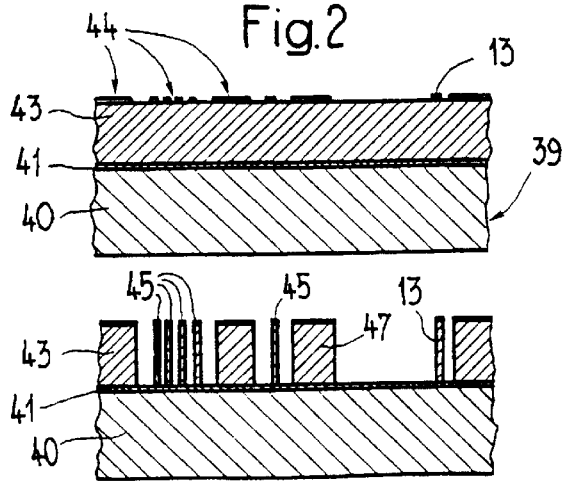
Fig. 2
Fig. 3
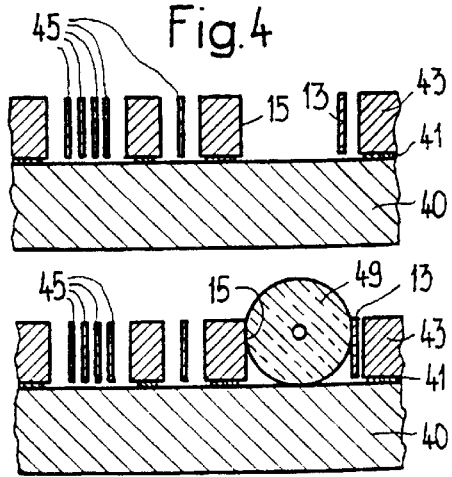
Fig. 4
Fig. 5

FIBER OPTIC CIRCUIT SWITCH AND A PROCESS FOR ITS PRODUCTION

This application is the national phase under 35 U.S.C. §371 of prior PCT International Application No. PCT/CH97/00356 which has an International filling date of Sep. 19, 1997 which designated the United States of America.

The invention concerns a fiber optic circuit switch and a process for the production of a fiber optic circuit switch.

A fiber optic circuit switch has been known since the publication of "Micro-Optic Switch as Bypass Element in Optical Data Networks" by J. Mohr, 1$^{st}$ Status Symposium of the Micro-Systems Technology Project, Karlsruhe Nuclear Research Center, 1993, pages 73–77. The known fiber optic circuit switch has four fiber optic light guides which join at the switch and a switching device that can be switched between two positions, two ball lenses and two deviating prisms.

In the switching position where the switching device is located outside the path of rays, radiation exiting from a first fiber is collimated with a first ball lens and directed into a second ball lens with a first deviating prism for focusing into a second fiber. A receiver, amplifier and transmitter are connected after the inlet in the second fiber. The transmitter feeds its radiation into a third fiber, which ends before the first ball lens collimating exiting radiation. This collimated ray is directed to the second ball lens with a second deviating prism in order to be focused by it into a fourth fiber.

In the example of the switching device that is inserted into the path of rays, radiation originating from the first fiber is collimated by the first ball lens, and the collimated ray is deviated onto the second ball lens with the switching device and focused by it into the fourth fiber.

The known micro-optic switch is executed with LIGA [X-ray depth lithography, electroforming, synthetic molding] technology, with the ball lenses having to be inserted into the layer thus produced.

It is the object of the invention to create a fiber optic circuit switch that can be produced in a simple and thus cost-efficient way with quick-switching features and the required dimensional and functional exactitude.

The object is met by eliminating additional optical elements apart from the light guides in the fiber optic circuit switch according to the invention, in contrast to the above-mentioned publication by J. Mohr. Furthermore, in contrast to the above-mentioned publication, the LIGA procedure is no longer used for production of the fiber optic circuit switch, but rather uses the procedure according to the invention described below.

Unlike the complex and therefore costly LIGA procedure, requiring a synchrotron radiation source, with the considerably less extensive procedure involving the, of the present invention all structures required for the switch can be produced, including the positioning aids described below for the light guide, which only have to be inserted into the finished component to the respective stop.

The movable control mirror integrated in the switch can also easily be coated optically.

In the following, examples of the fiber optic circuit switch of the invention as well as its production process are explained in greater detail with the help of drawings. Further advantages of the invention appear from the following description. In the drawings:

FIG. 1 is a top view of the fiber optic circuit switch of the invention,

FIG. 2 is a cross-sectional view through a masked SOI wafer for production of the fiber optic circuit switch of the invention, FIG. 3 is a cross-sectional view, similar to FIG. 2, after a deep anisotropic reactive ion etching procedure has been conducted, FIG. 4 is a cross-sectional view similar to FIGS. 2 and 3, after another etching step has been conducted for completion of the fiber optic circuit switch of the invention, FIG. 5 is a cross-sectional view similar to FIG. 4, with inserted fiber optic light guide, FIGS. 6a through 6f are variations of the manufacturing procedure as shown in FIGS. 2 through 5, and FIG. 7 is a variation of the fiber optic circuit switch shown in FIG. 1, with raised wide profile areas being equipped with a 30° seriph.

The invented fiber optic circuit switch shown in FIG. 1 was produced according to the manufacturing process described below on an SOI wafer 39 (silicon on insulator) as a sandwich wafer. The fiber optic circuit switch has four fiber optic light guide insertion channels 1a through 1d, arranged at right angles to each other, into which pointed light guides, which preferably are tapered at the fiber ends, are inserted after completion of the switch. All fiber optic light guide insertion channels 1a, 1b, 1c and 1d are located in one plane and run at an angular taper 3a, 3b, 3c and 3d towards a central location 5, into which a mirror 7 with moving capabilities meshes. Just before location 5, stops 9a through 9d are incorporated in the angular tapers 3a through 3d, respectively, for the tapered fiber optic light guide ends. The stops 9c and 9d are designed appropriately on both sides for the respective fiber optic light guide ends; due to insertion of the mirror, the stops 9a and 9b are designed this way only on one side.

Tapers 3a through 3d are designed such that the ends of inserted light guides are located as closely to each other as possible. The distance between them is only determined by the minimal space requirement of the movable mirror 7. Due to this compact arrangement, optical image systems can be foregone, in contrast to the version by J. Mohr described above.

The tapered light guide ends are produced in accordance with W. Hunziker et al., "Elliptically lensed polarisation maintaining fibers", Electronics Letters, Vol. 28, No. 7, Pages 1654–1656, Aug. 13, 1992. However, contrary to the version described in this publication, the cylindrical core protruding from the tapered fiber casing is poured into a material and then ground until it is flush. After the grinding process, the casting compound is removed again.

On one of the side walls 11a through 11d, respectively, of the light guide insertion channels 1a through 1d, several (in this case two) resilient brackets 13a through 13d are installed. For reasons of simplification, FIG. 1 shows only one of the two resilient brackets 13c and 13d on walls 11c and 11d. These brackets 13a through 13d now press the inserted light guides to the opposite channel wall 15a, 15b, 15c or 15d, which exactly positions the respectively inserted light guide and prevents it from being pulled out. The insertion resistance generated by these brackets 13a through 13d is low.

As a control component, the mirror 7 can be inserted into location 5 through a slot 17. The mirror 7 is arranged on a filigree support 19. At the support end as well as its approximate center, a small supporting beam 21a through 21d, respectively, is arranged to left and right vertical to its longitudinal axis, which is also of filigree design. The beam side walls are each designed with a comb structure 22a through 22d. The comb structures 22a through 22d alternately mesh with a second suitable comb structure 23a through 23d. It is particularly important to ensure that, on the gear mechanism of the entire mirror fastening design, mechanical vibrations around the limit position of the location 5 (influence on radiation exiting from the fiber ends) are avoided or minimized, or that the design is selected in such a way that vibrations do not disrupt radiation transmission or blocking. Versions of this type of execution are described below.

When placing electric potential between the comb structures 22a/22b and 23a/23b, they are pulled towards each other and thus the mirror 7 is pushed into location 5 via the small supporting beams 21a and 21b and the support 19. When electric potential is placed between the comb structures 22c/22d and 23c/23d, the mirror 7 is pulled out of location 5.

The mirror 7, the support 19, the small supporting beams 21a through 21d as well as the comb structures 22a through 22d are suspended freely on the SOI wafer base element 25 via two paired spring elements 27a through 27d, designed to the left and right of the support. The spring elements 27a through 27d are designed as leaf springs with double meander shaped partial leaf spring elements. The spring elements' design will be explained in greater detail on the spring element 27a. A web 29 that runs parallel to the support 19 is formed on the right outer end of the small supporting beam 21a. Starting at this web 29, two partial leaf spring elements 30a and 30b run parallel to the small supporting beam 21a which graduate into a web 31 that is located in the support's lengthwise direction and next to the support 19. Starting at this web 31, two additional partial leaf spring elements 32a and 32b run parallel to the partial leaf spring elements 30a and 30b which graduate into a web 33 that is in alignment with web 29. Starting at this web 33, two further partial leaf spring elements 34a and 34b run parallel to the other partial leaf spring elements 30a/b and 32a/b, graduating into a web 35 that is in alignment with web 31. Starting at this web 35, two more partial leaf spring elements 36a and 36b run parallel to the other partial leaf spring elements into a location 37 of the SOI wafer base element 25.

In this location 37 and other locations analogous to this one, the mirror 7, the support 19, the small supporting beams 21a through 21d and the spring elements 27a through 27d are held mechanically on the SOI wafer base element 25. This location simultaneously serves as electric zero potential for mirror movement via the comb structures 22a through 22d and 23a through 23d.

Each of the webs 29 has a lug 36 opposite of which a fixed notch 38 is arranged on the base element 25. Lug 36 and notch 38 serve as a stop for movement of the mirror in order to be able to assign the mirror an exactly adjustable specified position. Since the lug 36 is located on the web 29 of the spring elements 27a through 27d, the excursion process is dampened to avoid vibration.

By utilizing the above-described double comb structure pairs, the mirror's shifting path is twice as large as when using only one comb pair at the same control voltage.

Production of the above-described fiber optic circuit switch is based on an SOI wafer 39 as depicted in FIG. 2. The SOI wafer 39 consists of a mono-crystalline silicon substrate 40 onto which an amorphous silicon dioxide $SiO_2$ layer 41 is applied. A silicon coating layer 43 is applied on top of this silicon dioxide layer 41. This silicon coating layer 43 is masked with a mask 44 as shown in FIG. 1 from a top view. Elements of the mask 44 are located in all of the areas (dark surfaces in FIG. 1) where material is not to be removed. The thickness of the coating layer 43 is selected according to the light guides that are to be inserted into the light guide insertion channels 1a through 1d. For example when using monomode fiber optic light guides, it is 75 µm. Substrate 40 and coating layer 43 are electroconductive, while the intermediate layer 41 is electrically insulating.

In a vacuum chamber, the unmasked parts of the coating layer 43 are now removed with a deep anisotropic reactive ion etching process. This step is performed at a pressure of 2.6 Pa, a temperature of −95° C.(−139° F.) and a tension of −70V (DC bias) between electrode and the SIO wafer. Furthermore, high frequency of 13.5 MHz, a gas flow of $SF_6$ at 200 ccm/min., of $O_2$ at 16 ccm/min. and CHF at 10 ccm/min are utilized. The ion source used is inductively coupled plasma.

This material removal process continues until the unmasked coating layer material is reduced down to the intermediate layer 41, as shown in a cross-sectional view in FIG. 3.

In a subsequent step of the procedure, the intermediate layer areas below the thin webs 45 shown in FIG. 3 are now undercut until they are freely suspended; this occurs at room temperature with 48 percent hydrofluoric acid. The intermediate layer areas beneath the wide webs 47 are etched only slightly into a chamfer shape. The wide webs 37 remain, as shown in FIG. 4. The thin ribs 45 are thus the filigree parts depicted in FIG. 1. Since the mirror 7, the support 19, the resilient brackets 13a through 13d, the small supporting beams 21a through 21d and the spring elements 27a through 27d with their partial leaf spring elements 30a/b, 32a/b and 34a/b as well as the webs 31, 33 and 35 are made up of elements of thin widths as filigree structures, only wide enough to meet mechanical requirements, we "etch them out". The same is done to the comb structures, although the comb structures 23a through 23d are undercut while still being fastened to the SOI wafer base element 25.

After production of the entire structure, the mirror 7 can be vapor-plated with an optical reflecting layer.

Afterwards the four fiber optic light guides are inserted, and the fiber optic circuit switch is complete. FIG. 5 shows a cross-sectional portion through the switch with inserted fiber optic light guide 49. The entire assembly can now be equipped with a glass cover.

The fiber optic circuit switch is designed in such a way that the mirror 7 is pushed into the location 5 only half way when the comb structures 22a through 22d and 23a through 23d are free from stresses.

The circuit point 50 is always set at zero potential. If potential is now placed on the circuit point 51, the mirror 7 is pulled completely out of the location 5. The fiber optic light guides' radiation paths located in the channels 1a and 1c as well as in 1b and 1d are now free and clear. When tension on the circuit point 51 is set at zero potential and potential is placed on the circuit point 52, the mirror 7 is pushed completely into the location 5, which interrupts the radiation path between the fiber optic light guides in channels 1a and 1c as well as 1b and 1d. Radiation direction between the fiber optic light guides 1a and 1d as well as 1b and 1c is now possible.

In the example shown here, electric control potential is in a range of 30 V. A switch process requires approximately 300 µs.

Contrary to the combs structure 22a–d and 23a–d version shown in FIG. 1, they can also be arranged "between" the paired leaf spring packages. The two fields 53a and 53b between the paired leaf spring packages in FIG. 1, however, would then have to be divided into four fields with regard to electric potential.

When using monomode fiber optic light guides, the conductor core guiding the light wave is about 10 µm thick.

For purposes of reflecting or blocking radiation originating from the light guide ends and transmitting into location 5, the mirror 7 requires a surface of only 15 to 20 μm. Instead of the mirror design described above, a mirror with a penetration coefficient of this scale can be used as a variation. Contrary to the image shown in FIG. 1, this mirror can now be held in place by one leaf spring structure support on either side. In this case, however, only one leaf spring package would be arranged to the left and right of the support. One support would then be responsible for moving the mirror in one direction, while the other would be moving it in the opposite direction.

Zero point positioning of the mirror 7 need not occur in the manner described above.

The mirror can be adjusted in such a way that it either deviates or transmits radiation of opposite fiber optic light guide ends when free from stresses.

In another version, which also permits a reduction in control tension, the comb fingers of the comb structures 21a–d and 22a–d are widened beneath the area overlapping with the comb fingers of the comb structures 23a–d so that the air gap between 21a–d or 22a–d and 23a–d is reduced when moving the comb actuator.

Monomode fiber optic light guides have a diameter of only approximately 10 μm. As described above, the mirror 7 thus uses only a surface of 20 μm×20 μm. Utilization of a coating layer 43 that is at least 75 μm thick is only necessary for ensuring that the light guide core is located at a sufficient depth.

Instead of the manufacturing procedure described above (FIGS. 2 through 5) the fiber optic circuit switch of the invention can also be produced with a procedure in accordance with FIGS. 6a through 6f. For this, insertion channels for the light guides that are to be inserted are first etched into the substrate 53 as the lowest layers. FIGS. 6a through 6f show only one insertion channel 55. Substrate materials utilized can be, for example, silicon, glass etc. During the manufacturing process according to FIGS. 6a through 6f silicon is used as substrate material. A channel for the light guides that is only 50 μm deep will be etched into the silicon substrate 53, for example with a 40% potassium hydroxide (KOH). The substrate 53 is equipped with an insulating layer 59 (preferably an oxide, nitride . . . ), which is applied through oxidation or in a CVD process. In a second step a second sheet 57 (as coating layer) is glued to or bonded with the first, lower sheet 53. The coating 59 is comparable to the above-mentioned intermediate layer 41. Instead of applying the coating 59 onto substrate 53, it can also be applied onto the coating layer 57. Should the sheet (coating layer) 57 be too thick, it can be reduced by polishing or etching (FIG. 6c). As described above, a thickness of about 20 μm is sufficient for this layer 57. In accordance with the structures that are to be generated for the fiber optic circuit switch, a masking process analogous to that shown in FIG. 2 occurs. A material removal process is now conducted as described in FIGS. 3 through 5. The material removal process in FIG. 6d thus corresponds to that shown in FIG. 3, the one shown in FIG. 6e to that in FIG. 4 and that shown in FIG. 6f to that in FIG. 5. Apart from simple execution, this manufacturing procedure's advantage consists, among other things, in the considerably lower height of parts that have to be moved for the switching process. Lower height results in lower dampening and thus in a reduced control time.

Instead of using a substrate, a coating layer out of silicon and an intermediate layer out of $SiO_2$ for the sandwich wafer, other materials can be used as well. For the coating layer, for example, metals such as aluminum, gold etc. can be utilized. For the intermediate layer electrically insulating layers such as oxides, nitrides etc. can be used as well. The intermediate layers can be applied in a CVD process (chemical vapor deposition). The coating layer must be electroconductive. For the lower layer (substrate) glass can also be utilized.

Figure 7:
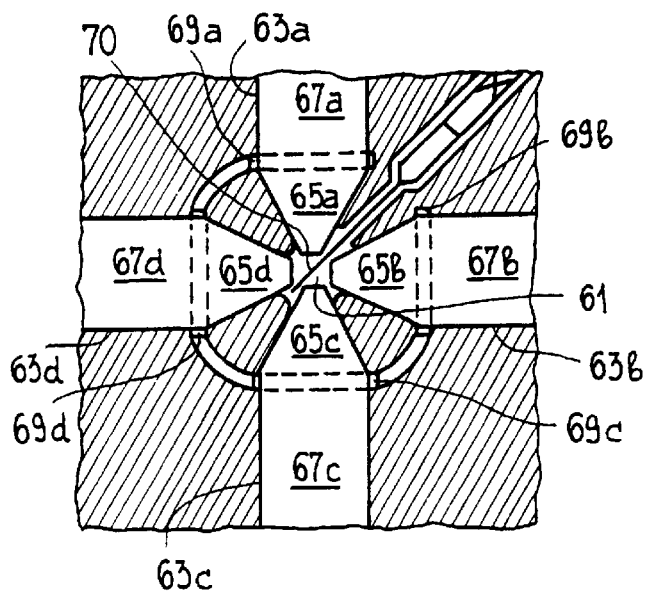

FIG. 7 shows an enlarged section of the variation for the central location 5, marked as 61 in this case. Contrary to the image in FIG. 1, the fiber optic light guide channels marked as 63a through 63d have no stops (9a through 9d in FIG. 1) in their tapered end sections 65a through 65d. In FIG. 7, the light guides 76a through 67d are glued into the light guide channels 63a through 63d. In order to prevent penetration into the central location 61 of the adhesive, which is still liquid before hardening, in particular through the capillary effect, each fiber optic light guide channel has a slot 69a through 69d before its tapered end section 65a through 65d starts, which are connected with each other. The preferred adhesive is a bonding agent that hardens under radiation, in particular UV radiation. The distance of the tapered light guides' fiber ends has been chosen so as to be small enough to barely allow free movement of the mirror, marked 70 in this case. The smaller the reciprocal distance of the fiber ends to each other, the lower the radiation losses between the fiber ends that are to be switched, i.e. the better the signal transmission is. In this case, the fiber ends are inserted under a microscope.

In order to avoid reflections of neighboring or connected fiber ends, they are equipped with an anti-reflection coating. Apart from being vertical to the fiber axis, the surfaces of the ends can also be shaped differently. Both the fiber ends and the mirror can be placed in an index matching oil (same refractive index as the core of the fiber transmitting the signal).

In the variations described above, the fastening device of the mirror 7 has stops (lug 36 on the webs 29 and chamber 38) for the respective limit switch position. In a simplified version, the stops for both final positions or for only one can be eliminated, and installation of only one spring element pair is possible as well.

When using only a single spring element pair, the mechanical design should preferably be selected in such a way that the mirror returns into a position without stop for the current-less condition. To reduce vibration tendencies of the mirror, the space between the fiber ends containing the mirror can be filled with an "index matching oil". Mirror movement is thus dampened through the occurring fluid friction. Utilization of the oils also allows a reduction in the arrangement's height. Furthermore, the oil prevents or at least drastically reduces reflection losses on the fiber ends.

Instead of the above-described fluid dampening process, dampening can also be achieved through "air resistance". The mirror, comb structure and suspension should then be designed appropriately large enough; however, there are limits due to the space that is available as well as weight (actuator weight). Also, the mirror can be designed so large in the switching direction that vibration movements of the mirror are within beam width starting at the fiber ends. Vibration dampening of the mirror, however, can also be achieved through a suitably designed voltage curve between the electrodes, in this case between the comb structures 22a/22b and 23a/23b or 22c/d and 23c/d (contrary to the image shown in FIG. 1, the variation described here includes only one of the comb structures).

In order to achieve a mirror surface with as low a surface roughness as possible, oxidation of the mirror surface is conducted after the etching step (FIG. 6d). Afterwards, the structures are etched free in accordance with FIG. 6e. Instead of oxidation, a doting process, for example with boron, can be conducted, followed by subsequent etching, for example in a caustic potash solution.

What is claimed is:

1. Procedure for the production of a fiber optic circuit switch having at least two light guides arranged within a plane and one movable optical switching device, comprising
   providing a sandwich wafer including a base substrate, an electrically insulating intermediate layer and a coating layer;
   masking the coating layer to selectively expose first partial areas that are to be movable after the manufacturing process, said first partial areas having a small first width, and partial control areas which are affixed to the base substrate, said partial control areas having a second width greater than said first width;
   etching the exposed areas of the masked coating layer in a first etching process down to the intermediate layer while forming nearly vertical etching walls in a dry etching procedure with a deep anisotropic reactive ion etching process; and
   applying an etchant in a second etching process that attacks only the intermediate layer for a time sufficient to remove completely the intermediate layer beneath said first partial areas of the first width but not beneath said partial control areas of the second width.

2. Procedure according to claim 1, wherein the switching device comprises a control part that can be inserted into and pulled out of a space between free neighboring light guide ends further comprising applying to said control part a coating that reflects radiation that is to be directed in the light guides.

3. Procedure according to claim 1 wherein the masking for the coating layer contains free areas having a width that corresponds to the diameter of a fiber optic guide to be inserted and that the free areas are designed as a straight strip extending to the edge of the wafer, the masking on one side of the strip defining resilient brackets that reach into the strip so that, after the etching steps of the process, a channel is created with tongues protruding into the channel as resilient adjusting elements, which press a light guide inserted into the channel.

4. Fiber optic circuit switch produced in accordance with the procedure of claim 1, comprising a sandwich wafer comprising a substrate, a coating layer, an electrically insulating intermediate layer, and at least two fiber optic light guides located within one plane and having tapered ends, each light guide being inserted in a respective insertion channel, and a switching device having a single control part which can be pushed into and pulled out of a space between neighboring fiber optic light guide ends, with the space between the light guide ends being minimally sufficient for the control part to be, inserted therein.

5. Fiber optic circuit switch according to claim 4, wherein the control part is arranged on a filigree support and the width of the support and of the control part is sufficiently narrow that after said deep anisotropic reactive ion etching process on the masked silicon coating layer the intermediate layer the intermediate layer can be undercut beneath the support and the control part by said etchant to release the support and the control part.

6. Fiber optic circuit switch according to claim 5, further comprising leaf spring elements on either side of said support, one end of which is connected to the support and the other end of which is connected to the unetched coating layer.

7. Fiber optic circuit switch according to claim 6, comprising two leaf spring pairs that are arranged one after the other.

8. Fiber optic circuit switch according to claim 6, comprising a fixed comb part and a movable comb part for causing movement of said control part in response to an electrical potential, wherein said movable comb part is connected to a filigree beam structure one end of which is connected to the support and the other end of which is connected to the leaf spring elements.

9. Fiber optic circuit switch according to claim 4, comprising a first comb structure including two interlocking combs spaced from each other and oriented perpendicular to the direction of movement of said control part, one said comb comprising a fixed part of said coating layer and the other said comb being freely movable and associated with said control part, whereby application of an electrical potential between said combs causes movement of said control part.

10. Fiber optic switch according to claim 9, further comprising a second comb structure including two interlocking combs spaced from each other, said first and second comb structures being arranged with opposite orientations whereby said control part is caused to move in opposite directions when electrical potential is applied to said first and second comb structures, respectively.

11. Procedure according to claim 1, wherein said second etching process is an isotropic etching process.

* * * * *